Jan. 7, 1936.                S. C. HILLS                 2,026,635
                        AUTOMATIC ALARM DEVICE
                         Filed Feb. 7, 1933

INVENTOR-
SIDNEY CLAUD HILLS
BY
ATTORNEY-

Patented Jan. 7, 1936

2,026,635

UNITED STATES PATENT OFFICE 2,026,635

AUTOMATIC ALARM DEVICE

Sidney Claud Hills, London, England, assignor to Radio Corporation of America, a corporation of Delaware Application February 7, 1933, Serial No. 655,600
In Great Britain February 11, 1932

4 Claims. (Cl. 177—353)

This invention relates to automatic alarm devices and more particularly to devices adapted to give an alarm signal, e. g. sounding an alarm bell automatically upon reception of a predetermined sequence of signal impulses. Such alarm devices may be employed for a variety of purposes, for example, on board ships at sea, the alarm being arranged to be sounded upon reception of a predetermined sequence of wireless signals, e. g. of three dashes each of four seconds duration with an interval of one second between consecutive dashes.

The present invention has for its object to provide an automatic alarm device of simple and relatively cheap construction and which shall be reliable and satisfactory in use.

According to this invention an automatic alarm device comprises one or more alarm members, such as for example electric bells, a step-by-step mechanism adapted when it has been moved through a predetermined plurality of steps to actuate the alarm device or devices, a first reciprocating member which is time controlled for one direction of movement and which is adapted each time it is moved in said direction to move said step-by-step member one step towards its actuating position, first electro-magnetic means for moving said first reciprocating member in the direction opposite to its time controlled direction of movement, trip means for releasing the step-by-step mechanism to permit it to return to its initial position, a second reciprocating member also time controlled for one direction of movement, and adapted at the end of a predetermined distance of time controlled movement, to complete the circuit of the first electro-magnetic means, a maintaining circuit for said first electro-magnetic means, said circuit being closed automatically upon energization of said first electro-magnetic means, a second electro-magnetic means for moving said second reciprocating member in a direction opposite to its time controlled direction, a relay actuated by received signals for breaking the circuit of said second electro-magnetic means when a signal is received, means actuated by the second reciprocating member after time controlled movement exceeding a predetermined distance for breaking said maintaining circuit and releasing said trip means, and means actuated by said first reciprocating member after time controlled movement exceeding a predetermined distance for independently releasing said trip means.

Figure 1:
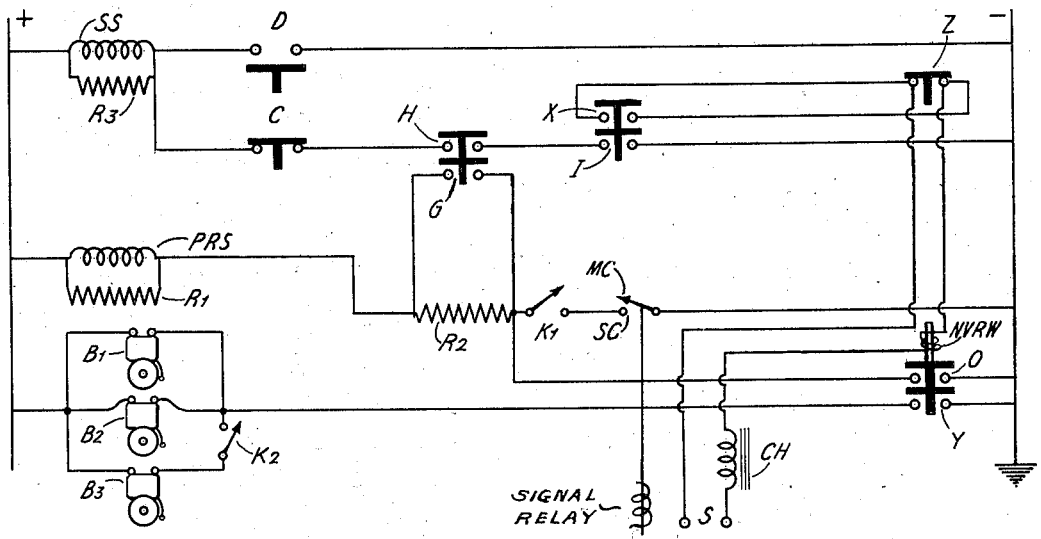
Figure 2:
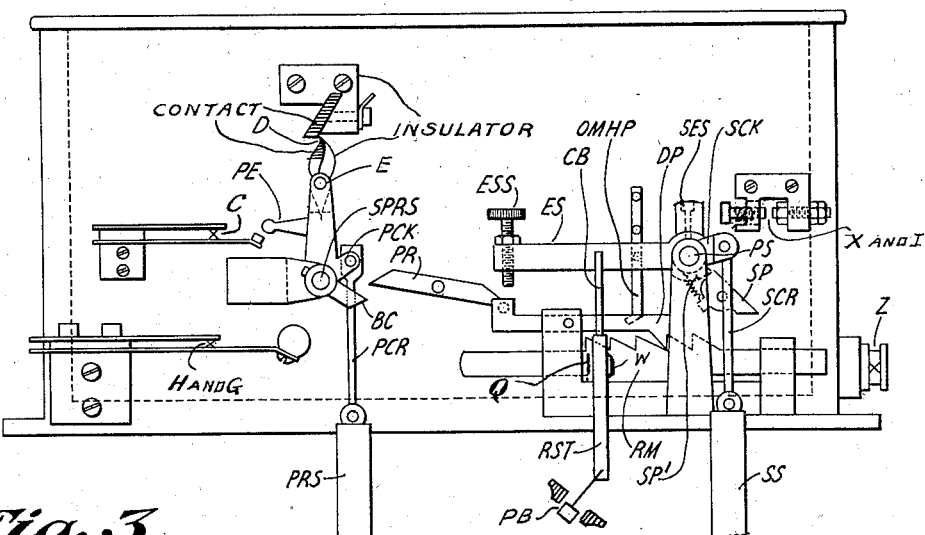
Figure 3:
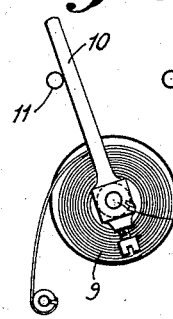
Figure 4:
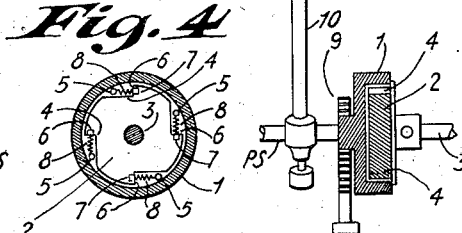
Figure 5:
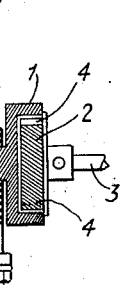

One arrangement of the invention is illustrated in the accompanying drawing in which Figure 1 shows schematically and in line diagram form the electrical circuits embodied, while Figure 2 shows the mechanical arrangements. Figures 3, 4 and 5 illustrate a detail. In the drawing the same parts are indicated by the same reference letters throughout.

Referring to the drawing, the extreme left-hand line marked + and the extreme right hand line marked — in Figure 1 represent the plus and minus terminals of a suitable voltage supply source, e. g. of 24 volts, whereby the control mechanism now to be described is actuated. The alarm devices consist of bells and in the case illustrated three bells $B_1$ $B_2$ $B_3$ are shown, the third bell $B_3$ being, for example, situated on the bridge of a ship and being connected in series with a key $K_2$ whereby said bell $B_3$ may be rendered inoperative when desired. The bells are energized in parallel in a circuit extending from the + line through the normally open contacts Y of a so-called "no-volt" relay (a term ordinarily employed in the art of electrical control gear to designate a relay arranged to operate or "trip" when its actuating voltage falls to zero) to the negative line. The contacts Y are normally held open by the winding NVRW of a no-volt relay, said winding being included in series in a circuit extending from one terminal of a source of potential S through a choke CH through the said winding NVRW, through normally closed contacts Z adapted to be opened when an alarm is to be sounded (as will be described later) back to the other terminal of the source S of supply. The contacts Z are adapted to be opened by a sliding rack member RM when said member has been moved to the right through a predetermined distance. The rack member is adapted to be moved towards the right by a spring biased striking pawl SP pivoted as shown in Figure 2 upon an arm SP' which is fixed to a shaft PS and is adapted to be moved in a clock-wise direction upon energization of a solenoid SS, said solenoid acting through a connecting rod SCR and crank SCK. The shaft PS is also arranged to be driven by a clock-work mechanism (not shown) so that when said shaft is moved into one extreme position by the solenoid SS the clock-work is wound, while upon release of the solenoid, the shaft is allowed to move back, i. e. anti-clock-wise in the figure, at a rate determined by the clock-work mechanism. Associated with the rack member RM is a dog pawl DP normally biased to engage the rack so that when said rack has been moved by the member SP for a distance of one tooth to the right it will normally be prevented from returning by the dog pawl DP. Also fixed to the shaft PS is an extension member ES which is so positioned that when said shaft reaches the end of its travel in the clock-work driven direction (i. e. when the solenoid SS is de-energized) an adjustable striker stud ESS carried by the extension member ES engages the end of the dog pawl DP and forces it out of contact with the teeth of the rack. Also fixed to the shaft PS is a second extension member SES which is so positioned that when the solenoid SS is energized contacts I and X are closed. The contacts X are in shunt with the contacts Z. The contacts I will be referred to later. The circuit for the solenoid SS is adapted to be made through a circuit extending from the positive line through said solenoid SS through a pair of normally open contacts D back to the negative terminal. The contacts D are adapted to be closed after a primary solenoid PRS has been de-energized for a predetermined period of time. One of the contacts O is as shown in Figure 2 formed on a member hinged at D' upon an arm E which is spring biased into the position shown and is fixed to a shaft SPRS which is controlled by the primary solenoid PRS so that when said solenoid is energized the shaft SPRS is moved in a clock-wise direction by means of a connecting rod PCR and a crank PCK. Contact D comprises part of an arm carrying a swiveled head which is mounted on the spindle of the clock-work mechanism. This head allows contact to be made by a wiping action in its upward travel, reversing, and sweeping back on the insulated side of the head when the arm has been pulled down. The shaft SPRS is controlled for movement in one direction (clockwise) by the solenoid PRS and in the other by a clock-work mechanism (not shown) the solenoid PRS when energized thus winding the clock-work. The circuit for the primary solenoid PRS extends from the positive line through said winding PRS and thence through a limiting resistance $R_2$, a key $K_1$ the spacing contact SC of a received signal actuated relay, whose armature is indicated at RA, back to the negative line. The marking contact of the signal relay is indicated at MC. In shunt across the limiting resistance $R_2$ is a pair of normally closed contacts G, said contacts being adapted to be opened by a member BC when the primary solenoid PRS is energized. This solenoid, when energized also opens, by means of the same member BC, a pair of normally closed contacts H which are in series with the contacts I and a pair of normally closed contacts C in a maintaining circuit extending from the positive line through the secondary solenoid SS, through the contacts C, the contacts H, and the contacts I back to the negative line. The no-volt relay also normally holds open a pair of contacts O connected between the positive side of the key $K_1$ and the negative line. $R_1$ and $R_3$ are shunts across the solenoids PRS and SS respectively and in a practical example these shunts may be of about 1,000 ohms each. Condensers and resistances, may be inserted in shock absorbing antisparking circuits across the primary and secondary solenoids, across the signal relay contacts, and across the no-volt relay coil contacts. The windings of the signal actuated relay are connected for energization to the output terminals of a radio receiver of normal construction.

Suppose the radio receiver is "alive" i. e. the valves are lit and the circuits thereof completed) but that no signal is being received. Under these conditions the primary solenoid PRS will be energized through the spacing contact SC of the signal relay (assuming of course the key $K_1$ be closed) and through the limiting resistance $R_2$. The contacts G and H will be open since PRS is energized and the circuit for the secondary solenoid SS will not be completed. As soon as a signal is received the relay armature RA moves over to the marking contact MC, the circuit for the solenoid PRS is broken and the shaft SPRS is driven round by its clock-work mechanism in an anti-clockwise direction. The first movement of this shaft allows the contacts G and H to close (the member BC no longer holding them open) so that the limiting resistance $R_2$ is short circuited. The clock-work mechanism associated with this shaft continues to drive it (assuming the received signal continues) until after a predetermined period of time, for example, three seconds, the normally open contacts D are closed. A circuit is thereby established for the secondary solenoid SS and in consequence the contacts X and I are closed by the member SES. A maintaining circuit is now established through solenoid SS, contacts C, contacts H and contacts I for the said secondary solenoid. When the said secondary solenoid is energized, the dog pawl DP is allowed to spring into contact with the rack teeth upon the rack member RM. During the whole period in which the primary solenoid is de-energized the shaft SPRS continues to move in the same direction, and if the signal persists for more than a predetermined period of time, for example, more than 5 seconds, a member PE (Figure 2) will reach and open the contacts C and accordingly de-energize the secondary solenoid SS, thus permitting contacts X and I to open. At the same time the shaft SPRS will, by means of the member BC and a pivoted link PR pivoted as shown, force the dog pawl off the rack tooth and a further pawl or catch member OMHP will slip its detent-formed end under the now raised dog pawl for holding it in its disengaged position. The catch OMHP is arranged behind the member ES and is so positioned and shaped that it wil be disengaged from under the dog pawl DP by the said member ES when it has almost reached its extreme anti-clockwise position. Assuming, however, that the received signal is a dash of the correct length (in the specific example now being described, 4 seconds), contact D will have been closed, the secondary solenoid energized, dog pawl DP allowed to come into engagement with the rack teeth and the contacts X and I will have been closed. When the received signal impulse ceases (contacts C have not been opened), the circuit of the primary solenoid is re-completed through the armature RA. The primary solenoid is consequently energized, opening the contacts H and thereby breaking the circuit of the secondary solenoid so that the shaft PS begins to return under the control of its clock-work mechanism. During the first half or thereabouts of this return movement, the member SP engages a rack tooth upon rack member RM and moves the said member for a distance of one tooth to the right. The clock-work mechanism controlling the shafts PS is so arranged that unless another signal impulse is received, say 1½ seconds from the beginning of the space following the last impulse, the said shaft PS will have moved to such a distance that the member ES will engage the dog pawl DP, force it out of contact with the rack tooth and allow the rack member to return to its original position. Assume, however, that the space is not too long and is (say) exactly one second. When the space comes to an end the armature RA moves across to the marking contact MC once more, and again breaks the circuit for the primary solenoid PRS, the cycle of operations being now repeated.

It will thus be apparent that the ratched member is advanced by a distance of one tooth for each signal impulse, assuming that the signal impulses and the spaces between them are of predetermined durations. When a predetermined number of correct impulses and spaces has been received, for example, three impulses, the rack member RM will have been moved sufficiently far to open the contacts Z. These contacts are included as above stated, in series with the no-volt relay NVRW and in consequence the alarm or alarms will be sounded, owing to de-energization of the no-volt relay windings. It will be noticed that the contacts X, arranged to be closed when the relay of secondary solenoid SS is fully energized, are provided in shunt with contacts Z and the arrangement is such that, for the last dash of an operating sequence of signals, the contacts X are arranged to open later than the contacts Z. This arrangement is adopted in order to allow for automatic re-setting of the apparatus, should the last dash be of too long a duration. Suppose the last dash in a sequence is of too long a duration, the contacts Z will be momentarily opened before the ratchet member RM has been returned by release of the dog pawl through the link PR. In consequence the no-volt relay winding circuit would be opened and the alarms would ring. However, if contacts X do not open till a suitable time after contacts Z have opened, this cannot happen and the alarm will not ring unless the last dash has been of proper length—i. e. not sufficiently long to cause actuation of the link PR and opening of contacts C. The delay in opening of contacts X after opening of contacts Z is so chosen as to allow the ratchet member RM time to advance to open the contacts Z and to spring back to its original starting position should the dog pawl DP be struck away from the rack teeth by the link PR. If the final dash has been of correct length, the contacts Z and X are opened and the alarms will ring. When the circuit for the winding NVRW is broken, contacts O are closed and the circuit for the primary solenoid is maintained through these contacts O and independent of the relay armature RA so that before the apparatus can be used again it must be re-set by hand. This may be effected by means of a push-button PB which, when depressed, enables the member RM to return to its left hand position. The mechanism whereby this is accomplished is shown schematically in Figure 2 and comprises a detent device RST which rides against the member RM and is so shaped and positioned relative thereto that when the said member RM has been moved to its extreme right hand position (in which it effects operation of the alarms) the detent device RST is allowed to move into a position in which it locks the member RM in its extreme right hand position (e. g. by having a projection W come behind a step Q in the side thereof) and in which a stop rod CB mounted on RST comes beneath the member ES and prevents its return to that extreme anti-clockwise position in which the dog-pawl is removed from the ratchet teeth. To re-set the apparatus the push button PB (which is represented schematically in Figure 2 and is associated with the device RST by any convenient mechanical linkage) is depressed, and the member RST accordingly moved out of its "locking" position, thus allowing the return of the member RM.

It will be noted that when the primary solenoid is energized the limiting resistance $R_2$ is brought into circuit with said solenoid and thereby reduces the amount of current ordinarily passed through said solenoid circuit to an amount necessary to hold the solenoid armature in its fully attracted position. It will be seen that the extra current necessary for this solenoid to attract its armature from an unattracted position is obtained by reason of the fact that except when said armature is in the said fully attracted position the resistance $R_2$ is short circuited.

The provision of the contacts I is to prevent interference by atmospherics or heavy jamming. Were these contacts not provided, it would be possible, in conditions of bad atmospherics or heavy jamming, for the member E to creep up towards the position in which it closes the contacts D and to "dither about", i. e. to move jerkily back and forth about these contacts opening and closing them intermittently. This would give rise to intermittent momentary energization of the secondary solenoid circuit. More specifically contacts I close the maintaining circuit which is not opened until contacts H are opened by the complete energization of PRS. Accordingly, repeated closing and opening of E will not step up rack RM unless the plunger PCR returns to a position to open contacts H after each closure.

Preferably the filaments of the valves in the signal receiver are energized in series with the no-volt relay winding so that when the alarm is in operation, i. e. when the bell circuit has been completed, the filaments are switched off.

Figure 3 illustrates in elevation, Figure 4 in sectional elevation and Figure 5 in side section, a preferred form of one way clutch and winding mechanism by which the shaft SPRS or the shaft PS, as the case may be, is associated with the winding shaft for the corresponding clockwork. Figures 3, 4 and 5 will be described with reference to the shaft PS and associated clockwork winding shaft, it being understood of course that a similar clutch is provided for the shaft SPRS. Referring to Figures 3, 4 and 5 there is keyed to the shaft PS a sleeve I which fits over a member 2 on the shaft 3. The member 2 is formed with steps 4, in each of which is mounted a loose roller 5, movement of the rollers endwise being prevented by the disc-like end of the sleeve I and the opposite disc-like end of the member 2. In the radial wall 6 of each step is drilled a small hole 7 in which is mounted a spring 8. Thus, when the shaft PS is moved in a clockwise direction (Figures 3 and 4) the clutch will not transmit any drive to the member 2 and its shaft 3, but when the said shaft is moved in an anti-clockwise direction, the rollers 5 jam or bind between the parts I and 2 and transmit drive practically without slip or backlash, the arrangement aproximating in effect very closely to that which would theoretically be obtained by a ratchet wheel and pawl mechanism in which the ratchet wheel had an infinite number of teeth. The shaft 3 drives a timed escapement mechanism (not shown) through suitable gearing (not shown). A spiral spring 9 is attached at one end to the member I and at the other to a suitable fixed anchoring, the spring being wound up when the parts are assembled. Movement of the shaft PS is limited by an arm 10 attached thereto and moving between stops 11 and 12. Thus when shaft PS is rotated so that the arm 10 is moved against the stop 12, the tension of the spring 9 will be increased, and when the shaft PS is released the rate of return movement of the arm 10 towards the stop 11 will be controlled by the time escapement mechanism.

What is claimed is:

1. An automatic alarm device adapted to give an alarm signal upon reception of a predetermined sequence of signal impulses and comprising an alarm giving member, a step-by-step mechanism adapted when it has been moved through a predetermined plurality of steps to actuate said alarm giving member, a first reciprocating member, having means arranged during movement in one direction to move said step-by-step mechanism one step towards its actuating position, means for time controlling the action of said first member each time it is moved in said one direction, first electromagnetic means for moving said first reciprocating member in the direction opposite to its time controlled direction of movement, trip means for releasing the step-by-step mechanism to permit it to return to its initial position, a second reciprocating member, means for time controlling the action of said last member each time it is moved in one direction, said second reciprocating member being adapted at the end of a predetermined distance of time controlled movement to complete the circuit of said first electromagnetic means, a maintaining circuit for said first electromagnetic means, said maintaining circuit being closed automatically upon energization of said first electromagnetic means, a second electromagnetic means for moving said second reciprocating member in a direction opposite to its time controlled direction, a relay actuated by received signals for breaking the circuit of said second electromagnetic means when a signal is received, means actuated by the second reciprocating member after time controlled movement thereof exceeding a predetermined distance greater than said first predetermined distance for breaking said maintaining circuit and releasing said trip means, means for opening said maintaining circuit during movement of said second reciprocating member in a direction opposite said time controlled movement, and means actuated by said first reciprocating member after time controlled movement exceeding a predetermined distance for independently releasing said trip means.

2. An arrangement as claimed in claim 1 and comprising means for preventing in the event of the final impulse of the predetermined sequence of impulses exceeding a predetermined duration, actuation of the alarm giving members when the step-by-step mechanism is moved into actuating position.

3. An arrangement as claimed in claim 1 and comprising normally open contacts in circuit with the second electromagnetic means and adapted to be closed to maintain energization of said means upon actuation of the alarm giving members substantially as and for the purpose described.

4. An automatic alarm device adapted to give an alarm signal upon reception of a predetermined sequence of signal impulses and comprising an alarm giving member, a step-by-step mechanism adapted when it has been moved through a predetermined plurality of steps to actuate said alarm giving member, a first reciprocating member having means arranged during movement in one direction to move said step-by-step mechanism one step towards its actuating position, means for time controlling the action of said first member each time it is moved in said one direction, first electromagnetic means for moving said first reciprocating member in the direction opposite to its time controlled direction of movement, trip means for releasing the step-by-step mechanism to permit it to return to its initial position, a second reciprocating member, means for time controlling the action of said last member each time it is moved in one direction, said second reciprocating member being adapted at the end of a predetermined distance of time controlled movement to complete the circuit of said first electromagnetic means, a maintaining circuit for said first electromagnetic means, said maintaining circuit being closed automatically upon energization of said first electromagnetic means, a second electromagnetic means for moving said second reciprocating member in a direction opposite to its time controlled direction, a relay actuated by received signals for breaking the circuit of said second electromagnetic means when a signal is received, means actuated by the second reciprocating member after time controlled movement thereof exceeding a predetermined distance greater than said first predetermined distance for breaking said maintaining circuit and releasing said trip means, means for opening said maintaining circuit during movement of said second reciprocating member in a direction opposite to said time controlled movement, and means actuated by said first reciprocating member after time controlled movement exceeding a predetermined distance for independently releasing said trip means, said alarm giving member being adapted to be energized through relay contacts which are normally held open, the energizing winding of said relay being in series with normally closed contacts adapted to be opened by the step-by-step mechanism when moved into its actuating position, a pair of normally open contacts in parallel with the normally closed contacts which are adapted to be opened by the step-by-step mechanism, said normally open contacts being adapted to be closed prior to the opening of the normally closed contacts and to be again opened sufficiently long after the opening of said normally closed contacts to permit said step-by-step mechanism being released in the event of a too long duration of the final impulse substantially as described.

SIDNEY CLAUD HILLS.